United States Patent
Takayama

(10) Patent No.: US 10,922,505 B2
(45) Date of Patent: Feb. 16, 2021

(54) RADIO FREQUENCY IDENTIFICATION INTERFACE FOR INTERACTING WITH A PRINTED CIRCUIT BOARD

(71) Applicant: International Business Machines Corporation, Armonk, NY (US)

(72) Inventor: Masao Takayama, Machida (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/358,780

(22) Filed: Mar. 20, 2019

(65) Prior Publication Data
US 2020/0302132 A1 Sep. 24, 2020

(51) Int. Cl.
*G06K 7/10* (2006.01)
*G06K 19/07* (2006.01)
*G06K 19/077* (2006.01)

(52) U.S. Cl.
CPC ..... *G06K 7/10366* (2013.01); *G06K 19/0723* (2013.01); *G06K 19/07773* (2013.01)

(58) Field of Classification Search
CPC ........... G06K 7/10366; G06K 19/0723; G06K 19/07773
See application file for complete search history.

(56) References Cited

U.S. PATENT DOCUMENTS

| 7,683,762 | B2 | 3/2010 | Kinoshita | |
| 2009/0002164 | A1* | 1/2009 | Brillhart | H04L 41/0681 340/572.1 |
| 2012/0326849 | A1* | 12/2012 | Relihan | G07G 1/145 340/10.6 |
| 2015/0115041 | A1 | 4/2015 | Zhang | |
| 2016/0299478 | A1* | 10/2016 | Junk | G05B 15/02 |

FOREIGN PATENT DOCUMENTS

| EP | 2133826 B1 | 8/2011 |
| JP | 2005215788 A | 8/2005 |
| JP | 2006052742 A | 2/2006 |
| JP | 2009246571 A | 10/2009 |
| JP | 2009264000 A | 11/2009 |

* cited by examiner

*Primary Examiner* — Thien M Le
*Assistant Examiner* — Asifa Habib
(74) *Attorney, Agent, or Firm* — Michael D. Purdham

(57) ABSTRACT

Provided for is a radio frequency identification (RFID) chip to be connected to a printed circuit board (PCB). The RFID chip includes an RFID antenna for receiving a radio wave from an RFID controller. The RFID chip also includes a register driven by induction power generated by the radio wave received by the antenna. The RFID chip writes data indicated by a write request from the RFID controller into the register being driven by the induction power, without power being supplied to the PCB from a host device containing the PCB.

18 Claims, 5 Drawing Sheets

RADIO FREQUENCY IDENTIFICATION INTERFACE FOR INTERACTING WITH A PRINTED CIRCUIT BOARD

BACKGROUND

Almost all computers include the use of one or more printed circuit boards (PCBs). Many times, one or more PCBs have configuration settings which can be changed depending on desired usage or needs. Currently, PCBs must be supplied with power when configuring settings and many times changing setting values cannot be done when the computer system is in operation. Additionally, in many instances, the settings of a PCB cannot be read solely with the interface present on the board which can lead to situations where the settings or status of a board cannot be determined.

SUMMARY

Disclosed herein are embodiments of a radio frequency identification (RFID) chip, where the RFID chip is to be connected to a printed circuit board (PCB). The RFID chip includes an RFID antenna for receiving a radio wave from an RFID controller. The RFID chip also includes a register driven by induction power generated by the radio wave received by the antenna. The RFID chip writes data indicated by a write request from the RFID controller into the register being driven by the induction power, without power being supplied to the PCB from a host device containing the PCB.

Also disclosed is a method for interacting with one or more printed circuit boards (PCB) using radio frequency identification (RFID). The method includes identifying one or more PCBs each connected to one or more RFID chips; sending first radio waves to the one or more RFID chips, wherein the first radio waves include settings for the one or more PCBs; sending second radio waves to the one or more RFID chips, wherein the second radio waves include a request for status information from the one or more PCBs; and receiving status information from the one or more RFID chips.

Also disclosed is a system for interacting with one or more printed circuit boards (PCB) using radio frequency identification (RFID). The system includes one or more PCBs each connected to one or more RFID chips and an RFID controller device. The RFID controller device includes one or more processors and a memory communicatively coupled to the one or more processors, wherein the memory comprises instructions which, when executed by the one or more processors, cause the one or more processors to perform a method comprising identifying one or more PCBs each connected to one or more RFID chips; sending first radio waves to the one or more RFID chips, wherein the first radio waves include settings for the one or more PCBs; sending second radio waves to the one or more RFID chips, wherein the second radio waves include a request for status information from the one or more PCBs; and receiving status information from the one or more RFID chips.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
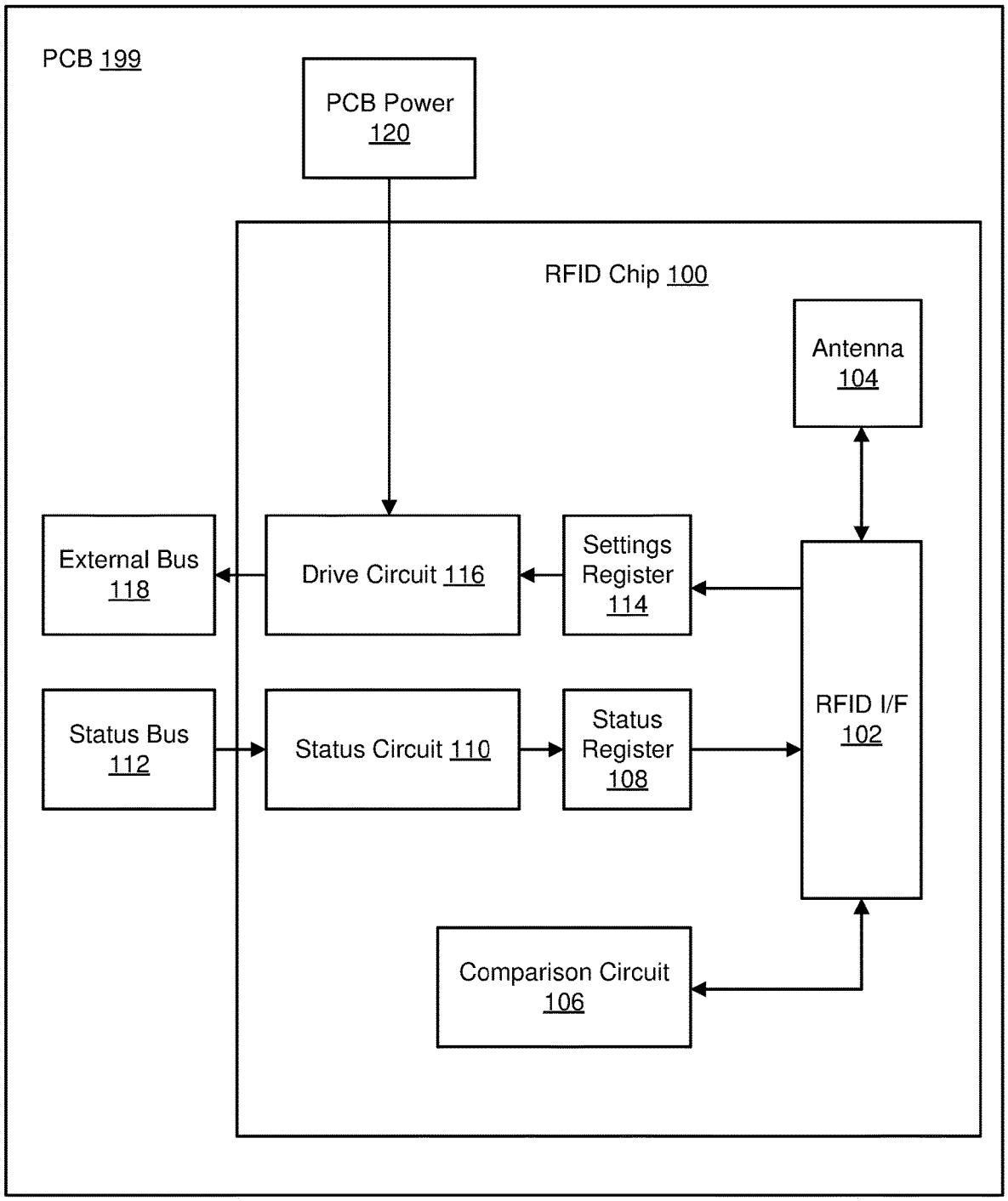
FIG. 1 depicts a block diagram of a Radio Frequency Identification (RFID) chip, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate generally to printed circuit board settings, and more specifically, to using a Radio Frequency Identification (RFID) enabled chip to configure settings and monitor status of printed circuit boards (PCBs). While the present disclosure is not necessarily limited to such applications, various aspects of the disclosure can be appreciated through a discussion of various examples using this context.

Many computers use PCBs and these boards generally have configuration settings which can be changed depending on usage or needs of the system or user. Additionally, many PCBs are created with initial settings built-in, which can only be changed to desired settings once the PCB is supplied with power for the first time in a system. For this first usage, the initial settings which are built-in must be used as there is no way to change them beforehand. Additionally, in many situations, the settings of the PCB cannot be changed asynchronously while the system is in operation.

In addition to changing settings, the status and/or settings of a PCB can be difficult to read depending on the environment or situation in which the PCB is in. For example, a PCB which is not connected to the computer system's interface typically cannot be read. Additionally, if a PCB is connected to a plurality of power sources (such as one or more backup power sources in addition to a primary power source), it may not be possible to determine in the event of a power source failure, which power source has failed. Additionally, if the power source for a PCB's interface is turned off, it may not be possible to check the status of the PCB. Another example where PCB status may not be able to be determined is when the host computer has experienced an error and is in a "hung" state or otherwise inoperable. In other situations, while determining the status of a PCB may be possible, it may be impractical, such as where there are a multitude of PCBs and the burden of the host computer to check the status or determine a source of failure becomes too great.

Embodiments of the present disclosure provide for an RFID chip which can be affixed to or otherwise coupled to a PCB. The RFID chip can be powered by induction, such that when it receives radio waves through an antenna (such as from an RFID controller device), it is powered without a connected power source. In other embodiments, the RFID chip can be connected to a battery or other power source. The RFID chip can operate to receive a signal to change the settings of the PCB to which it is connected, and it can store these settings in a register and use a drive circuit to send these instructions to the PCB. Additionally, the RFID chip can receive from the PCB status messages or indications (including one or more voltages present on the PCB) using a status circuit and which it can store in a status register. This information can be sent back to a RFID controller device which is communicating with the RFID chip. In some embodiments, the RFID chip and/or PCB can have a unique identifier such as a card ID. When communicating by radio waves with an RFID controller device, the RFID controller can include in the signal one or more card IDs to indicate which card(s) should apply the settings being sent or send status indications for the card(s). In some embodiments, security keys can also be implemented and sent between the RFID chip and the RFID controller.

An RFID chip as described herein provides advantages over prior art technology. For example, embodiments of the present disclosure allow for configuring initial settings of a board and for checking the status of a board before or without starting up the system. This information can be sent to or from the RFID chip from an RFID controller device and save the host computer system time, ease its work load, and prevent using inaccurate settings. Embodiments which use a security key can pass this key through means other than the host computer and can thereby allow for security authentication before starting the system. Embodiments of the present disclosure can also avoid bus collisions that may otherwise occur during initialization. Embodiments also allow for performing initialization on a plurality of PCBs with different settings using different card IDs. Embodiments of the present disclosure allow for changing setting values at any time asynchronously with the computer system while it is in operation. Embodiments of the present disclosure also allow for performing initialization and/or status checking of each of a plurality of boards by using non-contact scanning with an RFID controller device, regardless of whether the PCB(s) are connected to a power source. Embodiments of the present disclosure allow for identifying a PCB in failure and for investigating the status of the failure through the use of an RFID controller device. These improvements and/or advantages are a non-exhaustive list of example advantages. Embodiments of the present disclosure exist which can contain none, some, or all of the aforementioned advantages and/or improvements.

Referring now to FIG. 1, depicted is a block diagram of a Radio Frequency Identification (RFID) chip 100, in accordance with embodiments of the present disclosure. RFID Chip 100 is shown on PCB 199, but in some embodiments, it may be separate from, but connected to the PCB. For example, in some embodiments, one or more RFID chips 100 may be placed in an easy to access position relative to the PCBs to which they are connected, for easier access by an RFID controller device (such as grouping them together or placing them on the outside of a rack).

RFID chip 100 is depicted with the various components shown in FIG. 1, but in other embodiments may have more or fewer components. For example, one or more registers or circuits of RFID chip 100 may be combined in some embodiments or may be absent in other embodiments. RFID chip 100 includes RFID interface (I/F) 102 which is connected to antenna 104. Antenna 104 can send and receive radio waves from one or more devices not connected to RFID Chip 100 (such as from an RFID controller device, not depicted). Antenna 104 can operate using various wavelengths of radio wave frequencies and may be limited to one or more ranges in some embodiments. Antenna 104 can also receive radio waves in accordance with one of several types of communication protocols known to those of skill in the art. Antenna 104 can also use the received radio waves to power RFID chip 100 using induction power. In some embodiments, antenna 104 can propagate the received radio waves to another component on RFID chip 100 for generation of induction power. RFID I/F 102 can be a transceiver for receiving signals from the radio waves from antenna 104 and a transmitter for sending signals to antenna 104 to transmit data from RFID chip 100.

RFID chip 100 includes comparison circuit 106, which can compare a unique identifier such as a card ID of RFID chip 100 and/or PCB 199 with an identifier sent to RFID Chip 100, such as from an RFID controller device. Comparison circuit 106 can verify that the information received is meant for RFID chip 100 by establishing a match (the received radio waves included a matching card ID to that contained on the chip) or determine that the information received is not meant for this RFID chip by determining no match. Comparison circuit 106 can be used where multiple RFID chips are used in proximity and radio waves are being sent to more than one of them at once, such that each RFID chip can receive separate instructions. Additionally, in some embodiments, comparison circuit 106 can compare a received security key with a security key stored on RFID chip 100. A security key can be used in embodiments where security is desired such that RFID chip 100 only responds or implements settings received in the event that a user or device with the appropriate security key has sent the radio waves and included the security key. The length and/or nature of card IDs and/or security keys used by comparison circuit 106 can vary in embodiments and can depend on various factors including the number of RFID chips used, the importance of the computer system involved, etc.

RFID chip 100 includes status register 108 and status circuit 110, and PCB 199 includes status bus 112. Status bus 112 can allow for data to be transmitted from PCB 199 to RFID chip 100 regarding the status of the PCB. This can include one or more voltage levels on PCB 199, which can be useful in diagnosing whether one or more components on PCB 199 have failed or are operating at an inappropriate level. Status Bus 112 can connect to status circuit 110 on RFID chip 100. Status circuit 110 can be an integrated circuit for receiving this information and can store this information in status register 108. Status register 108 can take various forms in embodiments and can one of several types of non-volatile memory (including e.g., electrically erasable programmable read-only memory (EEPROM), ferroelectric random access memory (FRAM)).

RFID chip 100 also includes settings register 114 and drive circuit 116, and PCB 199 includes external bus 118. Settings register 114 can be storage for settings for PCB 199 and can be written to after receipt of these settings by antenna 104 and RFID I/F 102. Settings register 114 can be in the same or similar form as status register 108 and, in some embodiments, these registers may be combined. These settings can be accessed by drive circuit 116 and sent to PCB 199 by external bus 118. Drive circuit 116 can be an integrated circuit. In some embodiments, an optional element 120, can be included. A power source on the PCB (PCB Power 120) can be used when the PCB is powered to assist the RFID chip 100 in sending the settings from the settings register 114 using drive circuit 116.

Figure 2:
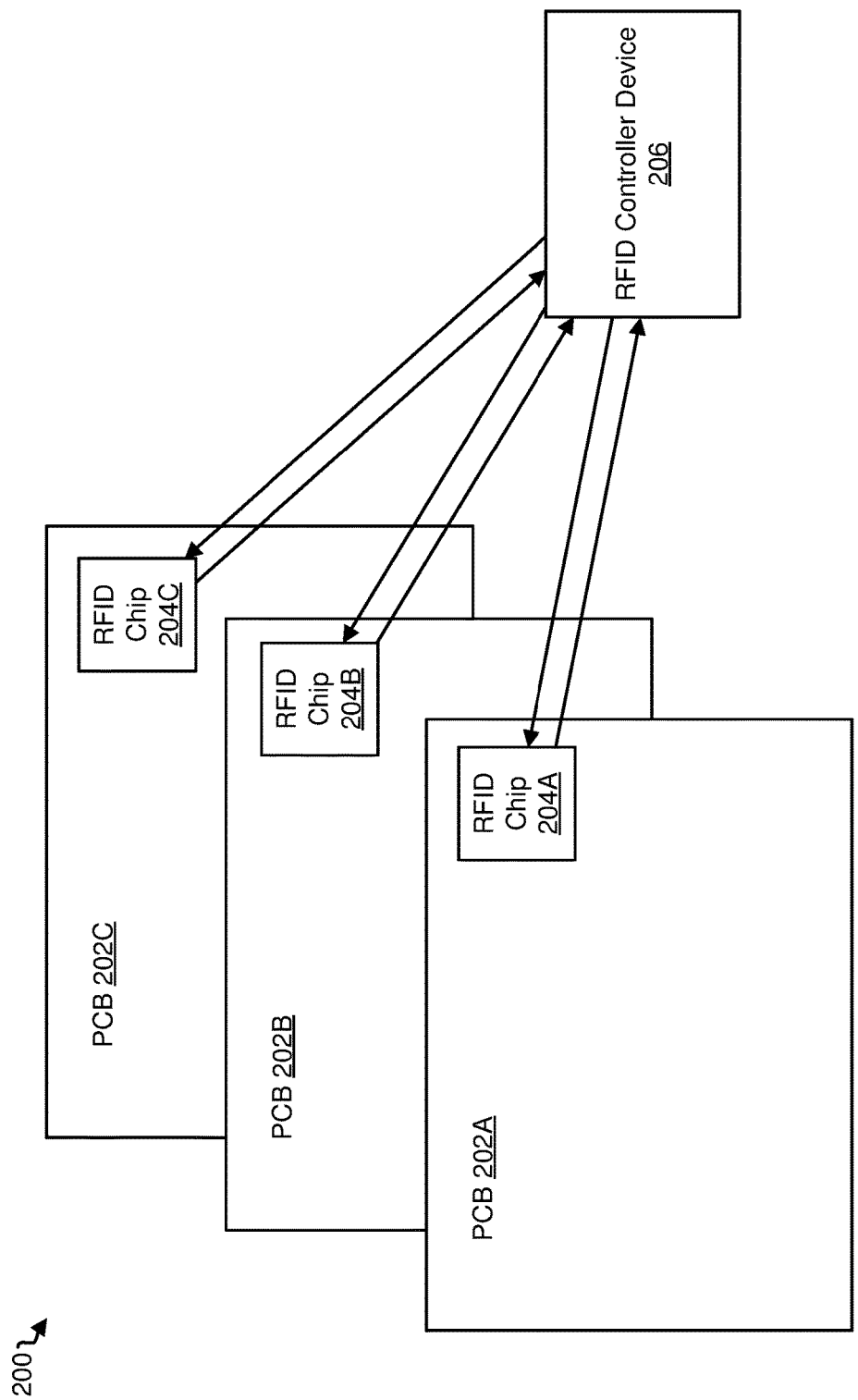
FIG. 2 depicts a block diagram of a computing environment using Radio Frequency Identification (RFID) chips, in accordance with embodiments of the present disclosure.

Referring now to FIG. 2, depicted is a block diagram of a computing environment 200 using Radio Frequency Identification (RFID) chips, in accordance with embodiments of the present disclosure. In FIG. 2, three PCBs 202A, 202B, and 202C (collectively PCBs 202) are depicted, each with a respective RFID chip 204A, 204B, and 204C (collectively RFID chips 204). Additionally, depicted is RFID controller device 206. While three PCBs 202 and three RFID chips 204 are depicted in FIG. 2, this is presented as an example embodiment and embodiments using one, two, or more than three of each of PCBs 202 and RFID chips 204 can also exist. In some embodiments, different numbers of PCBs 202 and RFID chips 204 can exist, such as where one RFID chip 204 is connected to multiple PCBs 202 or vice versa.

Each of PCBs 202 can be substantially similar to PCB 199 of FIG. 1 and each of RFID chips 204 can be substantially similar to RFID chip 100 of FIG. 1. For example, RFID chips 204 can contain the same components as RFID chip 100, with the same functionalities as discussed above. Each of RFID chips 204 can communicate with RFID controller device 206. In some embodiments, this may occur sequentially, such as by RFID controller device 206 sending radio waves to each of RFID chips 204 in turn. This may involve moving RFID controller device 206 along a path to target each RFID chip 204 in turn. Such movement could be done manually or could be automated, such as by installing RFID controller device 206 on a track which moves along a server rack or other computer device. In other embodiments, RFID controller device 206 may send notifications to multiple of RFID chips 204 at the same time (such as when configuring a plurality of PCBs 202 with the same settings).

As depicted by the arrows flowing from RFID controller device 206 to the RFID chips 204, the RFID controller device can send information to the RFID chips. This can occur during initialization, including sending settings to the RFID chips 204 for the attached PCBs 202. These settings may be accompanied by a write request to indicate the settings should be written to the PCBs 202. This information can also include card IDs or other unique identifiers (or semi-unique identifiers, such as a set of identical cards sharing one identifier) and/or security keys. In other embodiments, or at other times, the information sent from RFID controller device 206 to RFID chips 204 can be a request for status information. This request can also include such card IDs and/or security keys.

As a nonlimiting example, RFID controller device 206 could send a message as follows: "RFID write, PCB 202A; key askuyh76: A=0, B=3, . . . , PCB 202B; key passw0rd: A=3, B=2, . . . , PCB 202C; key Puneve$dat896: A=0, B=0, . . . " In this example message, each of PCBs 202 have a card ID equal to their reference numeral herein, such that when the RFID chip 204 corresponding to the PCB 202 receives this message, it can identify the portion of the message pertaining to that PCB. Example security keys of "askuyh76," "passw0rd," and "Puneve$dat896" are included following the card IDs, such that each RFID chip 204 which receives this message can disregard the message if there is a security key mismatch, and/or send an error to RFID controller device 206. Additionally, each of these security keys are followed by a series of settings which herein are represented as a setting "A" with an example value as shown, a setting "B" with an example value as shown, and an ellipsis to indicate additional settings could be included.

As depicted by the arrows flowing from RFID chips 204 to RFID controller device 206, the RFID chips can send information to the RFID controller device. This can include verification information, such as a message that the RFID chips 204 received the settings from RFID controller device 206 and/or that the settings were successfully applied. This can also include status information of the PCBs 202 and/or the RFID chips 204, such as the settings currently present and/or one or more voltage or current values on the PCBs 202. This information can be used in detecting faults or voltage mismatches on the PCBs 202.

Figure 3:
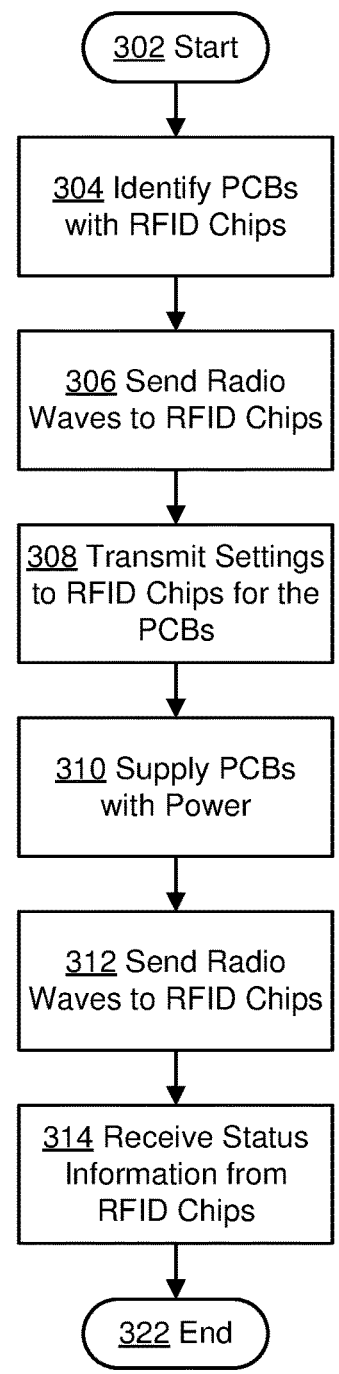
FIG. 3 depicts an example method for interacting with a printed circuit board using RFID technology, in accordance with embodiments of the present disclosure.

Referring now to FIG. 3, depicted is an example method 300 for interacting with a printed circuit board using RFID technology, in accordance with embodiments of the present disclosure. Method 300 can include more or fewer operations than those depicted. Method 300 can include operations in different orders than those depicted. In some embodiments, method 300 can be performed using one or more PCBs such as PCBs 199 of FIG. 1 and PCBs 202 of FIG. 2, RFID chips such as RFID chip 100 of FIG. 1 and RFID chips 204 of FIG. 2, and one or more RFID controller devices, such as RFID controller device 206 of FIG. 2. Some or all of these components may be present within a computer system (such as computer system 400 depicted in FIG. 4).

From start 302, method 300 proceeds to 304 to identify one or more PCBs with RFID chips. This may occur in various ways in embodiments. In some embodiments, an RFID controller device can send radio waves requesting a response from any RFID chips which receive the radio waves. Any such responses may contain identifying information for the RFID chips. In other embodiments, a user of an RFID controller device or a computer system containing PCBs with RFID chips may have a listing of PCBs with RFID chips or other source of identification for the relevant components present in a given computer system.

At 306, which may occur at the same time or as part of operation 304, an RFID controller device sends radio waves to the identified one or more RFID chips. This can occur to provide the RFID chips with sufficient power to operate using induction power. In some embodiments, the RFID chips may use a battery or other power source and not require induction power. This operation may also be combined with operation 308 in some embodiments.

At 308, the RFID controller device transmits settings to the one or more RFID chips for the PCBs. Operation 308 can occur at different times in embodiments. For example, this can occur before the PCBs are used for the first time in order to establish desired first settings which are not the same as those settings which are built into the PCBs. Because the RFID chips can use either induction power or a battery, there is no need for a computer system containing the PCBs to be powered on during operation 308. In other embodiments, this can occur during system runtime such that the settings can be changed asynchronously from the system.

This transmittal can take a form such as that provided above in the discussion of FIG. 2, with card IDs, security keys, and settings values for each of the one or more RFID chips. In some embodiments one or more of these components may be omitted. For example, in an environment where security is not at issue, security keys may be omitted such that settings can be communicated faster, and/or the one or more RFID chips will not need to perform a comparison of security keys. Upon receipt of the settings, the one or more RFID chips for the PCBs can save the settings in a settings register, such as settings register 114 of FIG. 1 and use a drive circuit, such as drive circuit 116 of FIG. 1 to transmit the settings to the PCB.

At 310, there is an optional step of supplying the PCBs with power. A computer system containing the PCBs can supply those PCBs with power and enable their operation. This operation can include using the settings that have been sent to the PCBs using RFID technology.

At 312, an RFID controller device sends radio waves to the identified one or more RFID chips in a similar fashion as operation 306. At 312, this may also include sending a request to the one or more RFID chips for status information. The request for status information may vary in embodiments and may be a request for confirmation of current settings present on the PCBs and/or RFID chips. The request for status information may also be a request for the RFID chips to send information regarding one or more voltages present on the PCB for error detection/investigation.

At 314, the RFID controller device receives the status information from the RFID chips. The received information can depend on the request for information sent at 312. An RFID chip can send a listing or confirmation of the settings present on the PCB to which the RFID chip is connected. In other embodiments, the RFID chip can send a listing of one or more voltages present on the PCB. For example, the RFID chip could send a list such as: "card ID: PCB1337: DC/DC between contact A and contact B: 1.2V, DC/DC between contact B and contact C: 1.5V, DC/DC between contact D and contact E: 2.5V, etc." This information can be used by the RFID controller device or a person receiving such information to identify a power fault depending on the detected voltages and the expected or acceptable voltages present on a PCB which has a card ID of PCB1337. This can be useful in many situations including e.g., when the host system has "hung" or is otherwise inoperable, for a user of the RFID controller device to investigate the fault without requiring access to the inoperable system or when the host system has a burdensome amount of PCBs or components to check for faults. After operation 314, method 300 ends at 322.

In some embodiments, method 300 or portions thereof can be performed in a sequential manner for each identified PCB with an RFID chip, while in other embodiments, operations of method 300 can be performed simultaneously or substantially simultaneously for all PCBs with RFID chips. In some embodiments, portions of method 300 may be performed in a looping manner, such as continuing to repeat operations 312 and 314 during system operation to detect changes in status information received from the RFID chips.

Figure 4:
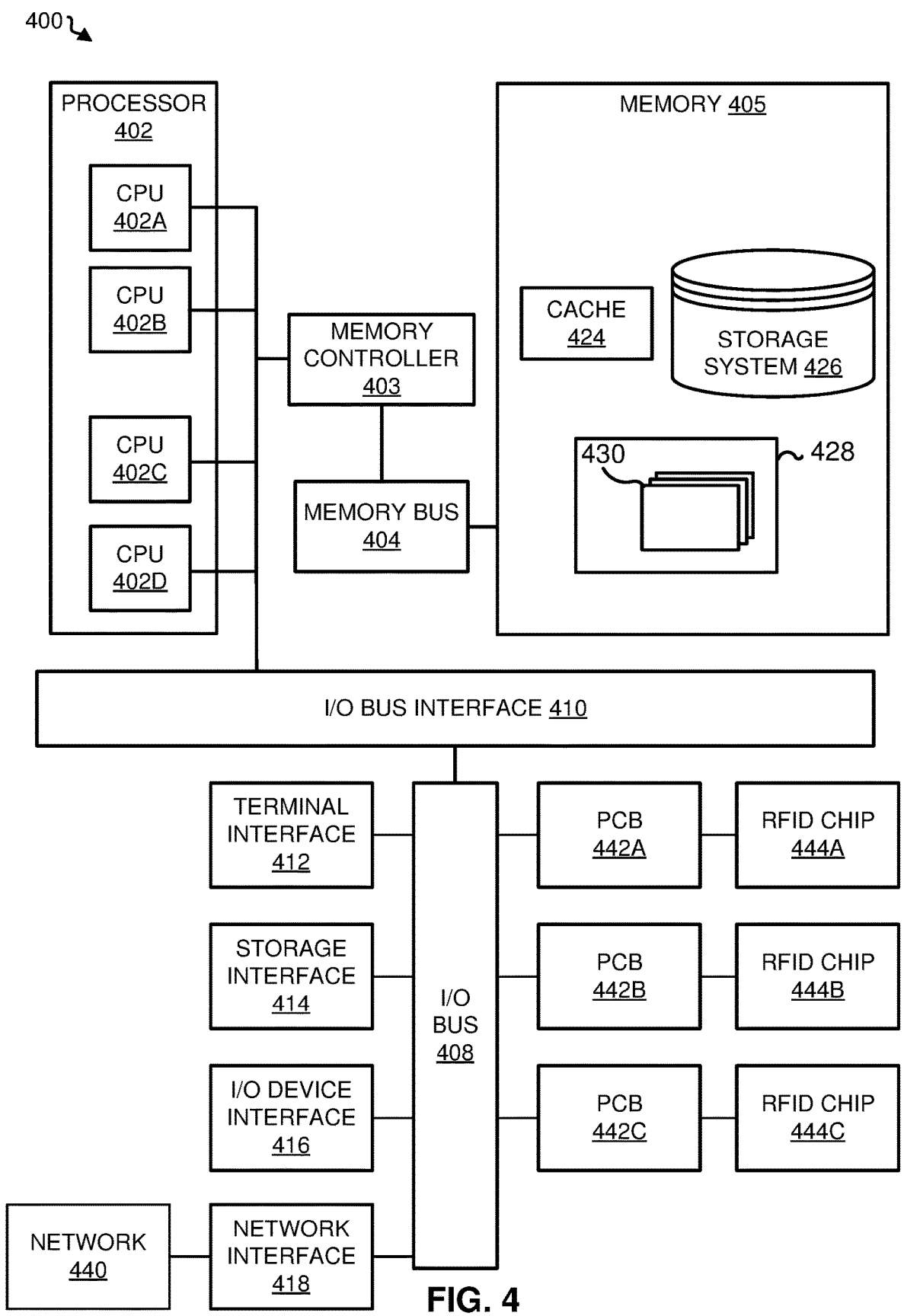
FIG. 4 illustrates a block diagram of a computer system, in accordance with some embodiments of the present disclosure.

Referring now to FIG. 4, shown is a high-level block diagram of an example computer system 400 that can be used in implementing method 300 in accordance with FIG. 3, tools, and modules, and any related functions, described herein, in accordance with embodiments of the present disclosure. In some embodiments, the components of the computer system 400 can comprise one or more processors 402, a memory subsystem 405, a terminal interface 412, a storage interface 414, an I/O (Input/Output) device interface 416, a network interface 418, and a plurality of PCBs 442A, 442B, and 442C (collectively PCBs 442) and RFID chips 444A, 444B, and 444C (collectively RFID chips 444) all of which can be communicatively coupled, directly or indirectly, for inter-component communication via a memory bus 404, an I/O bus 408, and an I/O bus interface unit 410.

The computer system 400 can contain one or more general-purpose programmable central processing units (CPUs) 402A, 402B, 402C, and 402D (four CPUs are shown by way of example and should not be read as limiting to or requiring four CPUs), herein generically referred to as processor 402 or CPU 402. Any or all of the CPUs of CPU 402 can contain multiple processing cores in various embodiments. In some embodiments, the computer system 400 can contain multiple processors typical of a relatively large system; however, in other embodiments the computer system 400 can alternatively be a single CPU system. Each CPU 402 can execute instructions stored in the memory subsystem 405 and can include one or more levels of on-board cache that provide temporary storage of instructions and data for the CPUs 402. The CPUs 402 can be comprised of one or more circuits configured to perform one or more methods consistent with embodiments of the present disclosure. The control of data flow from the processor 402 to the memory subsystem 405 can be facilitated by memory controller 403. The memory controller 403 can be configured to direct data to appropriate locations (e.g., addresses) within the memory subsystem 405.

Memory subsystem 405 can include computer system readable media in the form of cache memory 424. Computer system 400 can further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 405 can include flash memory, e.g., a flash memory stick drive or a flash drive. In some embodiment, the storage system 426 can be replaced by storage area-network (SAN) devices, the cloud, or other devices connected to the computer system 400 via the I/O device interface 416 or a network 440 via the network interface 418. Memory devices can be connected to memory bus 404 by one or more data media interfaces.

It is noted that FIG. 4 is intended to depict representative components of an exemplary computer system 400. Computer system 400 can also be referred to as a host device. In some embodiments, however, individual components can have greater or lesser complexity than as represented in FIG. 4, components other than or in addition to those shown in FIG. 4 can be present, and the number, type, and configuration of such components can vary.

One or more programs/utilities 428, each having at least one set of program modules 430 can be stored in memory 405. The programs/utilities 428 can include a hypervisor (also referred to as a virtual machine monitor), one or more operating systems, one or more application programs, other program modules, user interfaces, and program data. Each of the operating systems, one or more application programs, other program modules, and program data or some combination thereof, can include an implementation of a networking environment.

The computer system 400 can interface a variety of peripheral devices, storage devices, and networks (including network 440) through the terminal interface 412, storage interface 414, I/O device interface 416, and network interface 418. For example, I/O device interface 416 can receive input from a user and present information to a user and/or a device interacting with computer system 400.

The computer system 400 also contains a plurality of PCBs 442A, 442B, and 442C (collectively PCBs 442) and RFID chips 444A, 444B, and 444C (collectively RFID chips 444). While three of each of PCBs 442 and RFID chips 444 are shown in computer system 400, this is for example purposes only and other numbers of PCBs and RFID chips can be used in embodiments. PCBs 442 and RFID chips 444 can take the same forms and have the same functions as the PCBs and RFIDs described throughout this disclosure including PCB 199, PCBs 202, RFID chip 100, and RFID chips 204.

Although the memory bus 404 is shown in FIG. 4 as a single bus structure providing a direct communication path among the CPUs 402, the memory subsystem 405, and the I/O bus interface 410, the memory bus 404 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 can, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices can be connected directly to one or more system I/O buses.

In some embodiments, the computer system 400 can be a multi-user mainframe computer system, a single-user system, or a server computer or similar device that has little or no direct user interface, but receives requests from other computer systems (clients). Further, in some embodiments, the computer system 400 can be implemented as a desktop computer, portable computer, laptop or notebook computer, tablet computer, pocket computer, telephone, smart phone, network switches or routers, or any other appropriate type of electronic device.

Figure 5:
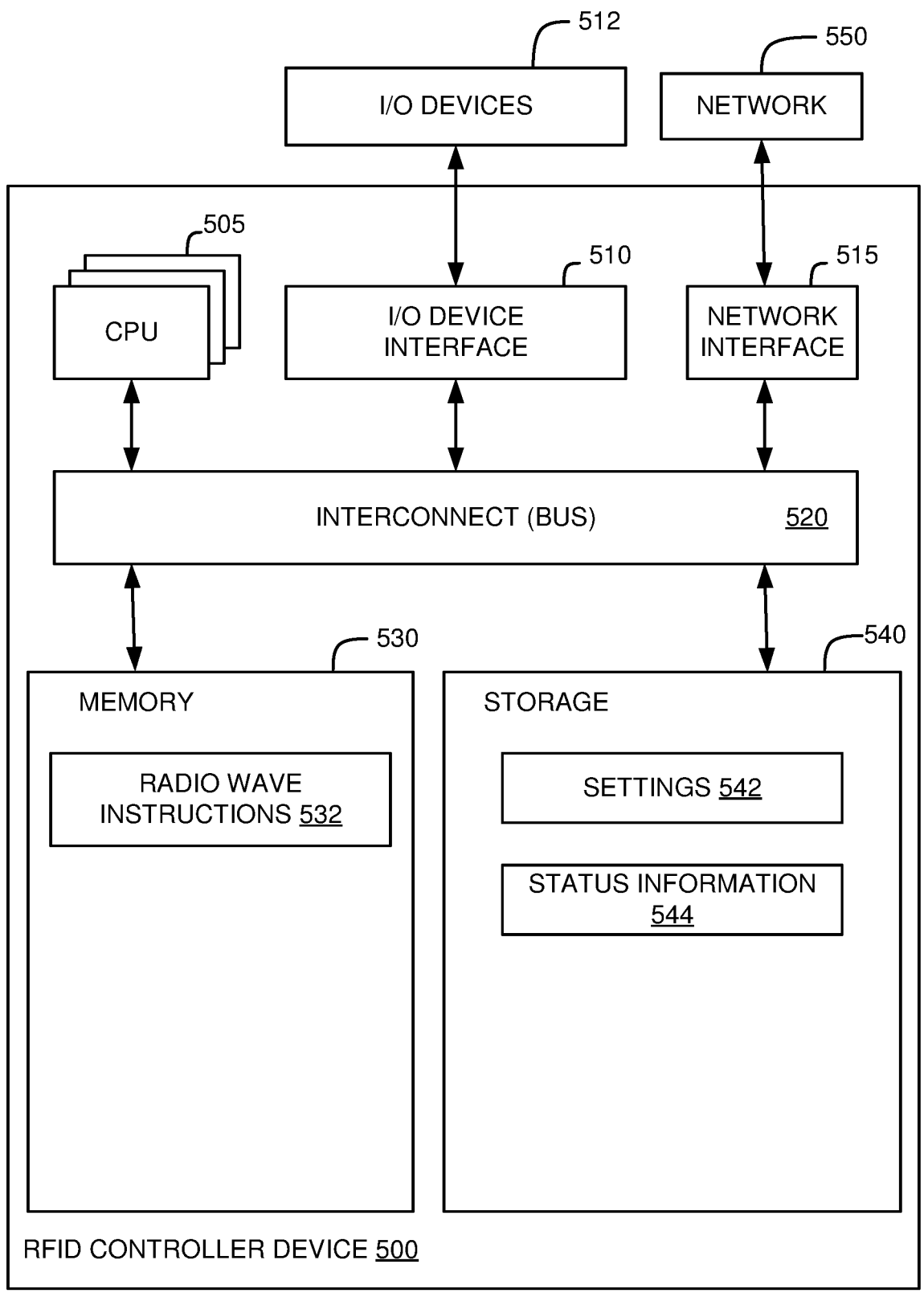
FIG. 5 illustrates a block diagram of an RFID controller device, in accordance with some embodiments of the present disclosure.

Referring now to FIG. 5, illustrated is a block diagram of an RFID controller device 500, in accordance with some embodiments of the present disclosure. In some embodiments, RFID controller device 500 performs operations in accordance with FIG. 3 as described above. In some embodiments, RFID controller device 500 can be consistent with RFID controller device 206 of FIG. 2. The RFID controller device 500 can include one or more processors 505 (also referred to herein as CPUs 505), an I/O device interface 510 which can be coupled to one or more I/O devices 512, a network interface 515, an interconnect (e.g., BUS) 520, a memory 530, and a storage 540.

In some embodiments, each CPU 505 can retrieve and execute programming instructions stored in the memory 530 or storage 540. The interconnect 520 can be used to move data, such as programming instructions, between the CPUs 505, I/O device interface 510, network interface 515, memory 530, and storage 540. The interconnect 520 can be implemented using one or more busses. Memory 530 is generally included to be representative of a random access memory (e.g., static random access memory (SRAM), dynamic random access memory (DRAM), or Flash).

In some embodiments, the memory 530 can be in the form of modules (e.g., dual in-line memory modules). The storage 540 is generally included to be representative of a non-volatile memory, such as a hard disk drive, solid state device (SSD), removable memory cards, optical storage, or flash memory devices. In an alternative embodiment, the storage 540 can be replaced by storage area-network (SAN) devices, the cloud, or other devices connected to the RFID controller device 500 via the I/O devices 512 or a network 550 via the network interface 515.

The CPUs 505 can be a single CPU, multiple CPUs, a single CPU having multiple processing cores, or multiple CPUs with one or more of them having multiple processing cores in various embodiments. In some embodiments, a processor 505 can be a digital signal processor (DSP). The CPUs 505 can additionally include one or more memory buffers or caches (not depicted) that provide temporary storage of instructions and data for the CPUs 505. The CPUs 505 can be comprised of one or more circuits configured to perform one or more methods consistent with embodiments of the present disclosure.

The memory 530 of RFID controller device 500 includes radio wave instructions 532. Radio wave instructions 532 can be an application or compilation of computer instructions for transmitting and receiving radio waves to and from one or more RFID chips, such as RFID chip 100 and RFID chips 204. Radio wave instructions 532 can include instructions to send settings to the one or more RFID chips to be implemented on one or more PCBs to which the RFID chips are connected, in accordance with the teachings presented above. Radio wave instructions 532 can include instructions for receiving card IDs, settings information, and/or status information from the RFID chips. Radio wave instructions 532 can also include instructions for processing and/or displaying the information received via radio waves, such as on a display or to a user of RFID controller device 500.

Storage 540 contains settings 542 and status information 544. Settings 542 can be settings in any format which is to be sent to RFID chips or are settings information received from RFID chips. The nature of settings 542 can vary in embodiments and depend upon the PCBs to which the settings are sent or received from.

Status information 544 can be various types of data which the RFID controller device 500 receives from the one or more RFID chips. This information can include one or more voltage levels on a PCB to which an RFID chip is connected. This information can be used in determining whether a fault exists on the PCB and/or where the fault is located. The nature of status information 544 can vary in embodiments and depend upon the PCBs to which the status information is received from.

In some embodiments as discussed above, the memory 530 stores radio wave instructions 532, and the storage 540 stores settings 542 and status information 544. However, in various embodiments, each of the radio wave instructions 532, settings 542, and status information 544 are stored partially in memory 530 and partially in storage 540, or they are stored entirely in memory 530 or entirely in storage 540, or they are accessed over a network 550 via the network interface 515.

In various embodiments, the I/O devices 512 can include an interface capable of presenting information and receiving input. For example, I/O devices 512 can receive input from a user and present information to a user and/or a device interacting with RFID controller device 500.

The network 550 can connect (via a physical or wireless connection) the RFID controller device 500 with other networks, and/or one or more devices that interact with the RFID controller device.

Logic modules throughout the RFID controller device 500—including but not limited to the memory 530, the CPUs 505, and the I/O device interface 510—can communicate failures and changes to one or more components to a hypervisor or operating system (not depicted). The hypervisor or the operating system can allocate the various resources available in the RFID controller device 500 and track the location of data in memory 530 and of processes assigned to various CPUs 505. In embodiments that combine or rearrange elements, aspects and capabilities of the logic modules can be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A radio frequency identification (RFID) chip to be connected to a printed circuit board (PCB), the RFID chip comprising:
   an RFID antenna for receiving a radio wave from an RFID controller; and
   a register driven by induction power generated by the radio wave received by the RFID antenna,
   wherein the RFID chip is configured to write data indicated by a write request from the RFID controller into the register being driven by the induction power, without power being supplied to the PCB from a host device containing the PCB; and
   wherein the RFID chip is configured to write data indicated by the write request from the RFID controller into the register asynchronously during runtime of the PCB.

2. The RFID chip of claim 1, wherein the data comprises an initial setting value for the PCB.

3. The RFID chip of claim 1, further comprising a comparison circuit driven by the induction power, configured to compare one or more first values received from the RFID controller with one or more second values stored in the register.

4. The RFID chip of claim 3, wherein the comparison circuit is configured to compare a first security key received from the RFID controller with a second security key stored in the register, and
   wherein the RFID chip writes the data into the register upon determining the first security key matches the second security key.

5. The RFID chip of claim 3, wherein the comparison circuit is configured to compare a first card identification value received from the RFID controller with a second card identification value stored in the register, and
   wherein the RFID chip writes the data into the register upon determining the first card identification value matches the second card identification value.

6. The RFID chip of claim 1, further comprising a status circuit driven by the induction power,
   wherein, when the RFID antenna receives a status request from the RFID controller, the status circuit transmits status information about the PCB to the RFID controller via the RFID antenna.

7. A method for interacting with one or more printed circuit boards (PCB) using radio frequency identification (RFID), the method comprising:
   identifying one or more PCBs each connected to one or more RFID chips;
   sending first radio waves to the one or more RFID chips, wherein the first radio waves include settings for the one or more PCBs;
   sending second radio waves to the one or more RFID chips, wherein the second radio waves include a request for status information from the one or more PCBs; and
   receiving status information from the one or more RFID chips;
   wherein the status information includes a plurality of voltage values corresponding to voltages present on the one or more PCBs.

8. The method of claim 7, wherein the sending the first radio waves occurs when the one or more PCBs are not connected to a power source.

9. The method of claim 7, wherein settings for the one or more PCBs are initial setting values for a first use of the one or more PCBs.

10. The method of claim 7, wherein the first radio waves include one or more first values for comparison with one or more second values stored in the one or more RFID chips.

11. The method of claim 10, wherein the one or more first values includes a security key.

12. The method of claim 7, wherein the one or more first values includes a card identification value.

13. A system for interacting with one or more printed circuit boards (PCB) using radio frequency identification (RFID), the system comprising:
   one or more PCBs each connected to one or more RFID chips, wherein the one or more RFID chips are grouped together and positioned separately from the one or more PCBs; and
   an RFID controller device comprising:
     one or more processors; and
     a memory communicatively coupled to the one or more processors,
     wherein the memory comprises instructions which, when executed by the one or more processors, cause the one or more processors to perform a method comprising:
       sending first radio waves to the one or more RFID chips, wherein the first radio waves include settings for the one or more PCBs;
       sending second radio waves to the one or more RFID chips, wherein the second radio waves include a request for status information from the one or more PCBs; and
       receiving status information from the one or more RFID chips.

14. The system of claim 13, wherein the sending the first radio waves occurs when the one or more PCBs are not connected to a power source.

15. The system of claim 13, wherein settings for the one or more PCBs are initial setting values for a first use of the one or more PCBs.

16. The system of claim 13 wherein the first radio waves include one or more first values for comparison with one or more second values stored in the one or more RFID chips.

17. The system of claim 16, wherein the one or more first values includes a security key.

18. The system of claim 13, wherein the status information includes a plurality of voltage values corresponding to voltages present on the one or more PCBs.

* * * * *